US007412710B2

(12) United States Patent
Oliva (10) Patent No.: US 7,412,710 B2
(45) Date of Patent: Aug. 12, 2008

(54) SYSTEM, METHOD, AND MEDIUM FOR EFFICIENTLY OBTAINING THE ADDRESSES OF THREAD-LOCAL VARIABLES

(75) Inventor: Alexandre Oliva, Sao Paulo (BR)

(73) Assignee: Red Hat, Inc., Raleigh, NC (US)

( * ) Notice: Subject to any disclaimer, the term of this patent is extended or adjusted under 35 U.S.C. 154(b) by 732 days.

(21) Appl. No.: 10/986,183

(22) Filed: Nov. 12, 2004

(65) Prior Publication Data

US 2006/0112374 A1    May 25, 2006

(51) Int. Cl.
*G06F 13/00* (2006.01)
(52) U.S. Cl. ...................... 719/331; 718/104
(58) Field of Classification Search ................. 719/331; 718/104
See application file for complete search history.

(56) References Cited

U.S. PATENT DOCUMENTS 6,820,261 B1 * 11/2004 Bloch .......................... 718/100
7,149,832 B2 * 12/2006 Wieland et al. .............. 710/269
2005/0183078 A1 * 8/2005 Shi et al. ..................... 717/149
2005/0283781 A1 * 12/2005 Karp et al. ................... 718/100
2006/0031810 A1 * 2/2006 Peng et al. ................... 717/100

OTHER PUBLICATIONS

Ulrich Drepper, ELF Handling for Thread-Local Storage, pp. 1-79 (2003).
Taylor, Ian Lance, "64-bit PowerPC ELF Application Binary Interface Supplement 1.9", 1.9 Edition, Published Jul. 21, 2004, 74 pages.

* cited by examiner

*Primary Examiner*—Andy Ho
(74) *Attorney, Agent, or Firm*—Wilmer Cutler Pickering Hale and Dorr LLP (57) ABSTRACT

A software method for obtaining an address of a thread-local variable while executing a computer program is described. The method designates a memory location to store an address of a function. The method, after the computer program starts to run, obtains the address of the thread-local variable by executing a resolver function whose address is stored in the memory location when a module that references the thread-local variable is loaded. The resolver can be a lazy resolver function or other resolver functions optimized for specific modules or variables.

18 Claims, 10 Drawing Sheets

Fig. 1. General Hardware Architecture (Prior Art)

Fig. 4 Detailed Virtual Address Space for Dynamic Loader, Executable File, and Dynamic Library

Fig. 5 Relocation Table and virtual address space

| Type | Symbol | Offset |
|------|--------|--------|
| DATA | 3 | 554 |
| --- | --- | --- |
| - | - | - |

501, 503, 505

Module's virtual address space (offset 554 into the module image)

Fig. 6 Symbol Table (Prior Art)

| Name |   |
|------|---|
| 0 | --- |
| 5 | --- |
| 9 | --- |
| --- | --- |

(1st element)
(2nd element)
(3rd element)

Fig. 7 String Section (Prior Art)

0 1 2 3 4 5 6 7 8 9 ... (positions)
ABCD efg x ...

Fig. 10 Various structures of a TLS Descriptor

| Resolver | Argument | Used When |
|---|---|---|
| Address of a function that applies a relocation and calls the newly-determined function | Address of the relocation to be applied | Initial value, enabling lazy relocation |
| Address of a function that returns the argument | TLS Offset | Variable defined in initially-loaded module |
| Address of a function that adds the DTV entry for the module with the in-mod offset | Module ID and in-module offset (possibly indirect) | Variable defined in late-loaded module |

Procedure Linkage Table (PLT)

| |
|---|
| ... |
| Lazy PLT Entries |
| Resolve Stub |
| PLT Entries |
| TLS Offset PLT Entries |
| ... |

1201

The entries can be located anywhere in the table

Fig. 12

SYSTEM, METHOD, AND MEDIUM FOR EFFICIENTLY OBTAINING THE ADDRESSES OF THREAD-LOCAL VARIABLES

FIELD OF THE INVENTION

The present invention relates to improvements in computer systems. In particular, the present invention is directed to obtain efficiently the addresses of thread-local variables of dynamic library modules.

BACKGROUND OF THE INVENTION

The following is a brief description of conventional hardware, single threaded processes, multi-threaded processes, thread-local storage, and lazy relocation. The description provides the context of the present invention.

1. General Hardware Architecture

Figure 1:
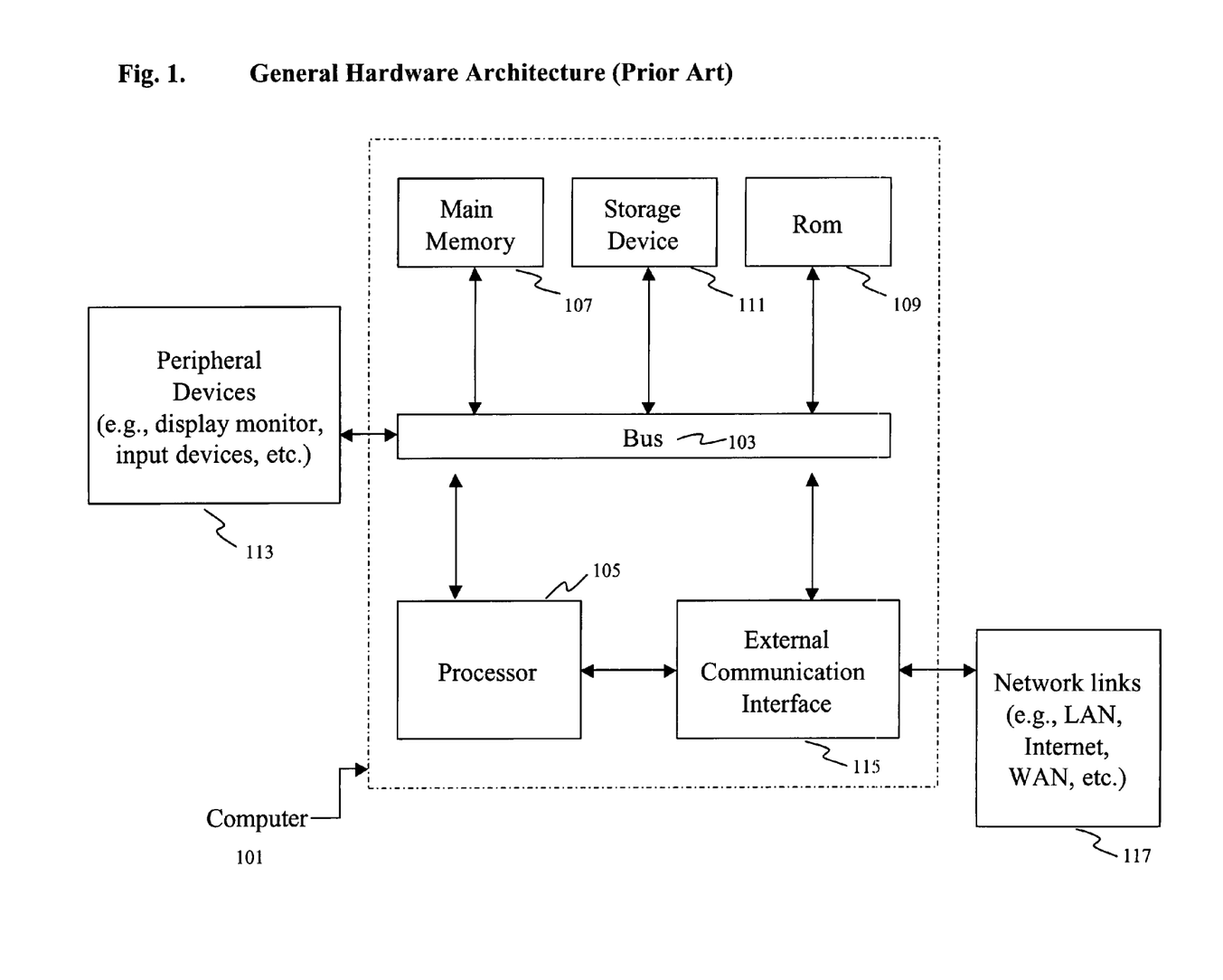
FIG. 1 is a block diagram illustrating conventional hardware architecture.

FIG. 1 is a block diagram that illustrates a conventional computer 101. The computer may include a bus 103 and a processor 105 coupled with the bus 103 for processing information. The processor 105 is also referred to as a central processing unit or CPU. The computer 101 also includes a main memory 107, such as a random access memory (RAM) or other dynamic storage device, coupled to the bus 103 for storing data and instructions to be executed by the processor 105. The computer 101 may also include a read only memory (ROM) 109 or other static storage device coupled to the bus 103 for storing static information and instructions for the processor 105. A storage device 111, such as a magnetic disk or optical disk, can also be provided and coupled to the bus 103 for storing information and instructions. The computer 101 may be also coupled, via the bus, to a number of peripheral devices 113 such as a display monitor, input devices (e.g., a key board), and other input/output devices.

The computer 101 also includes an external communication interface 115 coupled to the bus 103. The external communication interface 115 provides a two-way data communication coupling to a network link 117 that is connected to, for example, a local network. For example, the communication interface 115 may be Cable or Digital Subscriber Line (DSL) card, a modem, or a wireless network interface card to provide a data communication connection to a corresponding type of telephone line.

2. Single Threaded Processes

Conventionally, a programmer writes source code in a particular programming language (e.g., C++ or the like). A compiler then transforms the source code into a set of object files. A link editor (also known as a linker) then creates a loadable module, consisting of an integrated set of object files. The loadable module is then loaded to the main memory and executed on a computer similar to the one illustrated in FIG. 1.

A static executable is a loadable module that includes no references to any external data or procedures. Such an executable wastes disk and memory space because all library routines are copied into the loadable module. In contrast, dynamic libraries can be used by a number of different processes, without having their contents be copied into the main executable, thereby saving disk space. Moreover, dynamic libraries containing only position-independent code do not need multiple copies of their code in memory, even when multiple different programs use them. Position-independence enables the operating system to share a copy of the code in physical memory among many processes. For this reason, such libraries are also known as shared libraries.

Position-independent modules use a relative addressing scheme when possible and an indirect addressing scheme to access through the Global Offset Table and Procedure Linkage Table otherwise, as known in the art. Position-dependent modules contain position-dependent instructions, which use absolute addresses in a virtual memory space. Position-dependent instructions are suitable for executables because they are generally expected to be loaded into a predetermined portion of the virtual memory. Dynamic libraries, on the other hand, should not assume a specific load location because their load locations may overlap with those of the executable or of other dynamic libraries. They must instead be loadable at arbitrary addresses. For this reason and to enable sharing, position-independent code for dynamic libraries is preferred.

Unlike code, data can and often is modified by processes. In order to give each program the illusion of running on its own, the operating system gives each process a separate copy of the data from the main executable and dynamic libraries.

3. Multi-Threaded Processes

The need for having multiple independent tasks running concurrently, while sharing global data, led to threads. A thread is one of potentially many instances of execution that operate within the context of a single process. All threads that belong to a process use the same address space, e.g., sharing the same global variables, the same set of open files, memory mappings, and etc.

Multi-threaded programming enables simpler modeling of applications with multiple partially-independent activities, but it comes at a cost because access to global variable is guarded by synchronization primitives that guarantee consistency when multiple threads attempt to access the global variables simultaneously. Synchronization is not only relatively expensive, when compared with access in the absence of synchronization, but also sometimes difficult to implement correctly.

Using thread-local (TL) variables avoids the costs and traps of synchronization. The TL variables can be used when sharing is not desirable. In other words, the use of TL variables brings the separation of data between processes to the multi-threaded programming model. When a variable is marked as thread-local, its value is not shared with other threads; instead, a distinct copy of the variable is created for each thread. This technique isolates, for example, error conditions, that have traditionally been stored in global variables (e.g., errno). In this example, if all threads shared this variable as a global variable, one thread might report an incorrect error condition if another thread ran into that error.

4. Thread-Local Storage

Each module has a "thread-local storage" (TLS) section that contains a set of TL variables defined in it. When linking an executable (as opposed to a dynamic library), the relative location of each TL variable is assumed to be a constant value, and the value is stored as an entry of a global offset table (GOT) because the exact constant value is only going to be known at run time. Here, the term "run time" means a time period during which a process runs or the CPU is executing code instructions of the process. During execution, the main executable accesses TL variables by loading the constant values from the GOT.

For dynamic libraries, however, this relative location of a TL variable may vary across different threads. Particularly for dynamic libraries loaded while the program is already running, the TLS may have to be allocated dynamically, possibly even on demand. Traditionally, for dynamic libraries, a library function named _tls_get_addr( ) is called to obtain the location of TL variables. The computations performed by this function are potentially time-consuming (at least compared with loading a constant from a table, e.g., GOT), and the presence of an explicit function call may require its callers to save registers that hold values they might need after the call, if such registers are not required to be preserved across function calls in the Application Binary Interface (ABI) specification.

Link editors commonly attempt to remove such calls by turning them into the more efficient load-constant-from-table access model, when it is possible. Unfortunately, this fails to recover all of the lost performance because the compiler already has made decisions based on the assumption that the value of certain registers could be modified by the call. Besides, the load-constant-from-table access model can only be used in main executables or in dynamic libraries that are willing to give up the ability to be loaded into a process after the process has started running.

5. Lazy Relocation

Most of the start-up time of a dynamically-linked program is spent by a dynamic loader applying relocations. The dynamic loader is the module that loads into memory and relocates all other modules. Relocating a module means, for each relocation (i.e., a reference to a symbol that needs to be resolved) present in the relocation table of a loaded module: a) determining in which module the referenced symbol is defined; b) computing a value based on the type of the relocation and the location of the symbol; and c) storing the value in a memory location determined by the relocation table entry.

Several techniques to avoid the need for dynamic relocations and to reduce the cost of performing dynamic relocations are known. Some conventional techniques include: a) the use of "COPY" relocations in executables; b) the use of relative addressing modes; c) the use of "RELATIVE" relocations for local symbols; d) forcing references to symbols to be resolved locally instead of enabling them to be overridden by the dynamic loader; and e) "lazy" binding of function addresses (also referred to as "lazy" relocation).

In one lazy relocation technique, the dynamic loader places the address of a "resolver" function into a GOT entry intended to hold the address of another function that the program may call during its execution. The address of the resolver is readily available to the dynamic loader, but the address of the function would be computationally expensive to determine. When the program first attempts to call the function using the address in the GOT entry, it will call the resolver instead. The resolver will only then proceed to determine the actual address of the function and store it in the corresponding GOT entry, such that subsequent calls go straight to the intended function.

In most implementations, the address initially stored in the GOT entry is not that of the resolver, but rather that of a PLT entry. This entry calls the resolver and passes additional information the resolver needs to determine which function it needs to resolve. The additional information is usually the address of the relocation table entry that determines how to compute the value to be stored in the GOT entry.

Conventionally, although calls to _tls_get_addr( ) may take advantage of the lazy binding technique, the information typically passed to it is obtained from the result of dynamic relocations that cannot be applied using the lazy binding technique. Embodiments of the present invention enable, among others features, such dynamic relocations to be applied using the lazy binding technique, thereby avoiding the cost of applying dynamic relocations for TL variables that are not referenced during the run time.

SUMMARY OF THE INVENTION

Embodiments of the present invention enable the location of TL variables to be determined lazily to reduce the start-up cost of applications that use them. Embodiments of the present invention also enable modules loaded before a programs starts running to take advantage of a more efficient access model, without requiring the modules to surrender the ability to be loaded while the program is running. This significantly reduces the performance penalty of the less efficient access model, described above, which is incurred by modules that are loaded while the program is running.

Further improvements are introduced, when accessing TL variables within an executable, by arranging for the TLS offset of the main executable to be an ABI-specified fixed constant. The present invention also contemplates biasing a thread pointer and other thread-local storage base addresses so as to extend the range of addressable locations for a computer architecture that offers an addressing mode that adds a limited-range displacement to a base address register.

In particular, embodiments of the present invention include a software method for obtaining an address of a TL variable while executing a computer program. The method includes the step of designating a memory location to store an address of a function. The method may also include the step of, after the computer program starts to run, obtaining the address of the TL variable by executing a function whose address is stored in the memory location when a module that references the TL variable is loaded.

Embodiments of the present invention may perform: the step a) of computing a thread-pointer offset of the TL variable; and the step b) of storing, at the memory location, an address of a first function configured to use the thread-pointer offset in computing the address of the TL variable. Here, the thread-pointer offset value is a relative address the TL variable from a base address of a static thread-local storage block in which the TL variable is allocated.

Embodiments of the present invention may also perform: the step c) of computing and storing a module id and an in-module offset; and the step d) of storing, at the memory location, an address of a second function configured to use the in-module offset and module-id in computing the address of the TL variable. Here, the module id is an identifier of the module in which the variable is defined, and the in-module offset value is the relative address of the TL variable from the base address of a thread-local storage block in which the TL variable is allocated.

Embodiments of the present may further perform the step of storing, at the memory location, an address of a third function configured to determine in which module the variable is defined and determine whether the thread-local storage for the module is allocated in a static or dynamic thread-local storage block. The third function can be configured to perform the steps a) and b), if the TL variable is allocated in a static thread-local storage block or perform the steps c) and d), if the TL variable is allocated in a dynamic thread-local storage block.

The memory location can be a corresponding thread-local storage descriptor of the TL variable.

Embodiments of the present invention may also perform the steps of creating a dynamic vector containing a plurality of pointers, writing to each pointer a base address of a thread-local storage block, and biasing the plurality pointers. Each biased pointer contains a value computed by adding a bias value and a base address of thread-local storage block. Here, the base address can be a relative address or an absolute address in a virtual address space.

Embodiments of the present invention may also perform the steps of creating a dynamic vector containing a plurality of pointers, and writing to the pointers base addresses of only dynamic thread-local storage blocks.

Embodiments of the present invention can also perform the step of using a relative base address of a thread-local storage block of the executable in computing the address of the TL variable. The relative base address is a fixed value. This step is performed if the TL variable is allocated for an executable.

Corresponding features can be implemented in a computer system or using a computer medium.

DETAILED DESCRIPTION OF THE DRAWINGS

For a fuller understanding of the nature and objects of the present invention, reference should be made to the following detailed description taken in connection with the accompanying drawings in which the same reference numerals are used to indicate the same or similar parts, wherein.

DETAILED DESCRIPTION OF THE EMBODIMENTS

Although FIG. 1 is a block diagram that illustrates a conventional computer system, embodiments of the present invention may be implemented on such a computer system. Even though only one processor is illustrated, multi-processor computers can also be used to implement embodiments of the present invention. Other variations on the illustrated computer 101 are also allowed as long as the computer is capable of running multi-threaded processes.

The term "computer-readable medium" as used herein means any medium that participates in providing instructions to the processor 105 for execution. Such a medium may take many forms, including but not limited to, non-volatile media, volatile media, and transmission media. Common forms of computer-readable media include, for example: magnetic medium such as a floppy disk, hard disk, magnetic tape; optical medium such as a CD-ROM, a DVD-ROM; memory chips or cartridges such as a RAM, a PROM, and EPROM, a FLASH-EPROM; a carrier wave such as digital signal configured to convey information; or any other medium from which a computer can read information such as instructions and data. Other examples of media also include external storage devices that have become more common, such as USB pen-drives, USB- or Firewire-connected disk enclosures, Optical Fiber-connected Storage Area Network or Network-Attached Storage.

Figure 2:
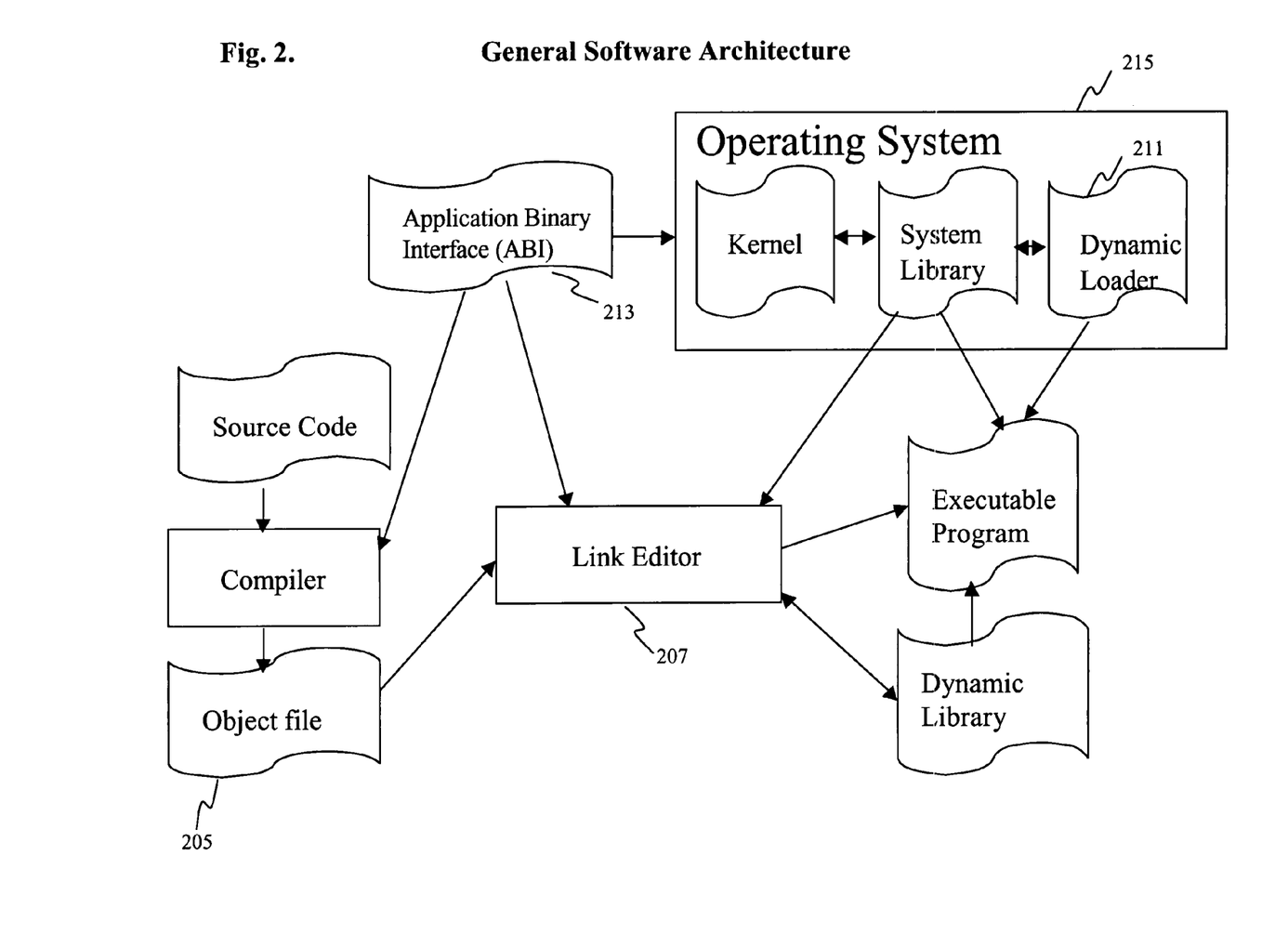
FIG. 2 is a block diagram illustrating an example software architecture on which embodiments of the present invention may be implemented.

FIG. 2 illustrates a general software architecture in which embodiments of the present invention can be implemented. FIG. 2 is provided only as an example, and variations on the software architecture are allowed as long as the software can support multi-threaded processes. Typically, an application (e.g., an Internet browser) may consist of an executable and a collection of dynamic libraries. (Some application may not include any dynamic libraries.) The link editor 207 (also known as a static linker) combines object files creating loadable modules such as executables and dynamic libraries.

Each object file may include address references, encoded as relocations, to locations in other modules or within itself. For example, one object file can reference a set of variables defined in one or more other object files. The link editor 207 creates, as noted above, a single module (the "loadable module") that is the combination of object files. The link editor 207 also either applies the relocation (i.e., resolves address references), if possible, or creates a dynamic relocation to be resolved at load-time.

In order to describe embodiments of the present invention, modules loaded before and after program start-up are clearly distinguished and further explained. At the program start-up time, a dynamic loader 211 (or the operating system kernel) loads an executable into the main memory. The dynamic loader looks for dependencies encoded in the executable and loads these dependencies (e.g., dynamic library modules) as well. These dependencies may require further dependencies, and so the dynamic loader loads them too. This procedure is repeated until no unsatisfied dependencies remain. Such modules are referred to as modules dynamically linked at start-up time (or hereinafter "the initially-loaded modules"). During run-time, on most systems, it is possible to load additional dynamic library modules into the address space of a running process after it has started running. This is achieved using a feature commonly known as dlopen( ). These are referred to as "dlopened" modules (or hereinafter "the late-loaded modules"). By differentiating the initially-loaded modules and the late-loaded modules and applying different procedures to them, the addresses of thread local variables can be more efficiently obtained compared with conventional systems. It should be noted that this distinction is sometimes only possible (and relevant) at run-time because a dynamic library can often serve as both initially- or late-loaded, for different processes. For instance, one process may need it loaded initially, while another may only load it at run-time. An executable, on the other hand, can always be assumed to be initially-loaded, and dynamic libraries can be created that require initial loading. Attempts to dlopen( ) such modules are likely to fail, although there are sometimes provisions to enable late-loading of a few such modules.

Now turning back to FIG. 2, an Application Binary Interface (ABI) 213 comprises a binary or machine language structure that specifies linkage conventions to interface the application program to a particular processor and a particular operating system 215 (e.g., GNU/Linux for the Fujitsu FR-V architecture).

Figure 3:
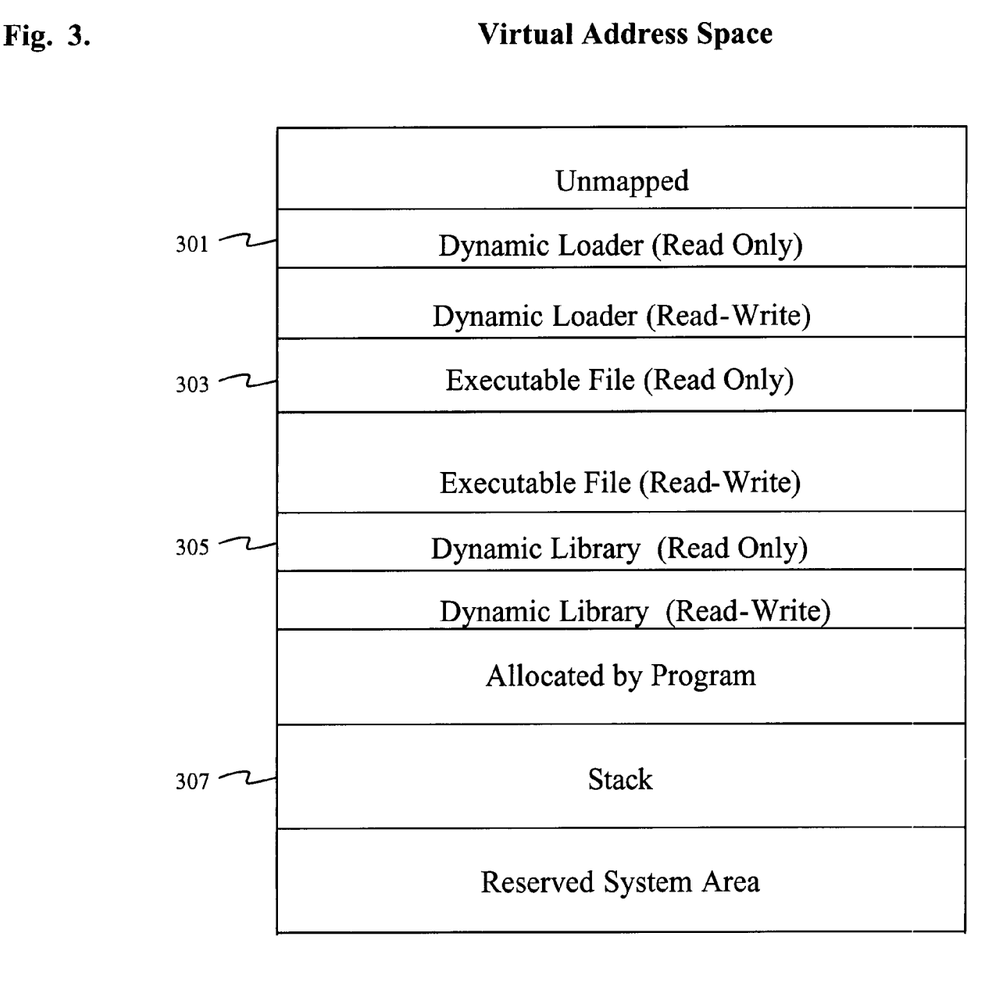
FIG. 3 is a chart illustrating an example virtual memory space that can be used to implement embodiments of the present invention.

As described above, the loadable module is loaded to the main memory. The loaded modules, along with memory areas used for other specific purposes, form a process image. A general structure of an example process image is shown in FIG. 3 in a virtual address space, which abstracts the physical address space of the main memory. Conventionally, a memory management unit translates virtual addresses in physical addresses, hiding physical addressing and letting processes run anywhere in the main memory. Although FIG. 3 shows a single stack configuration, it is illustrated only as an example. In a multi-threaded process, each thread has its own stack.

The process image in the virtual address space, illustrated in FIG. 3, includes a section 301 used by dynamic loader. The virtual memory space also includes at least one executable file 303, dynamic libraries 305, stack 307 and others. A process, consisting of many modules, is then loaded in the virtual memory space before run-time.

Figure 4:
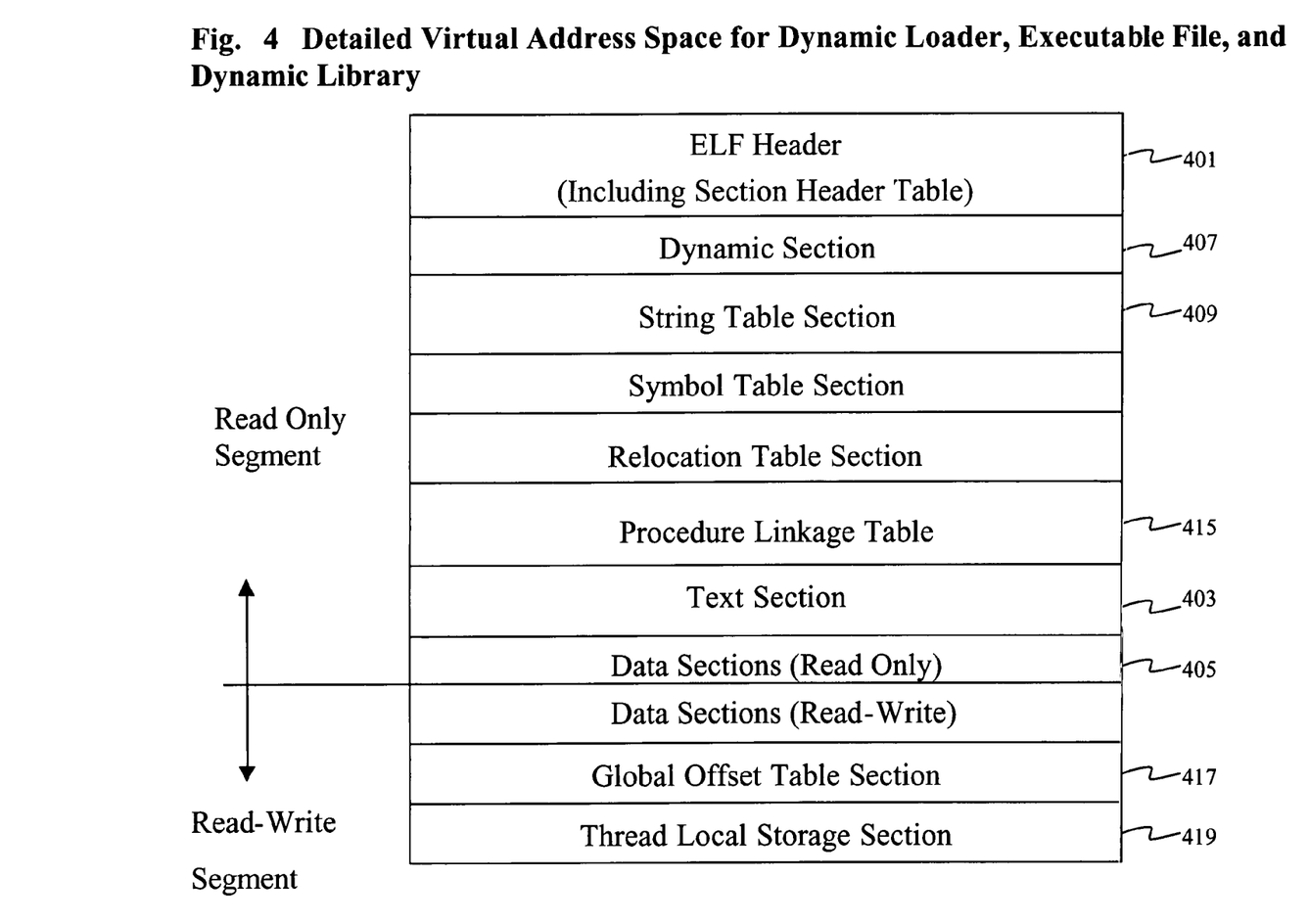
FIG. 4 is a chart illustrating a detailed example of virtual address space for dynamic loader, executable file, and shared library that can be used to implement embodiments of the present invention.

FIG. 4 illustrates an example of a detailed structure of a loadable module (e.g., an executable, a dynamic library, the dynamic loader). The program comprises an ELF header 401 that specifies the number and sizes of the various sections of the program, in addition to other information required by the operating system. The actual text (program instructions) 403 and data 405 of the program are provided in a number of discrete sections. A dynamic section 407 contains dynamic linking information for use by the dynamic loader.

In order for the link editor and the dynamic loader to perform the required relocations and resolve absolute addresses as required, a relocation table is used along with a string table and a symbol section. The string table stores text names of symbols including data constants, variables and strings. The symbol section references the string table. In turn, the relocation table provides a link between the instruction code in various sections, the link editor, and the dynamic loader.

Figure 5:
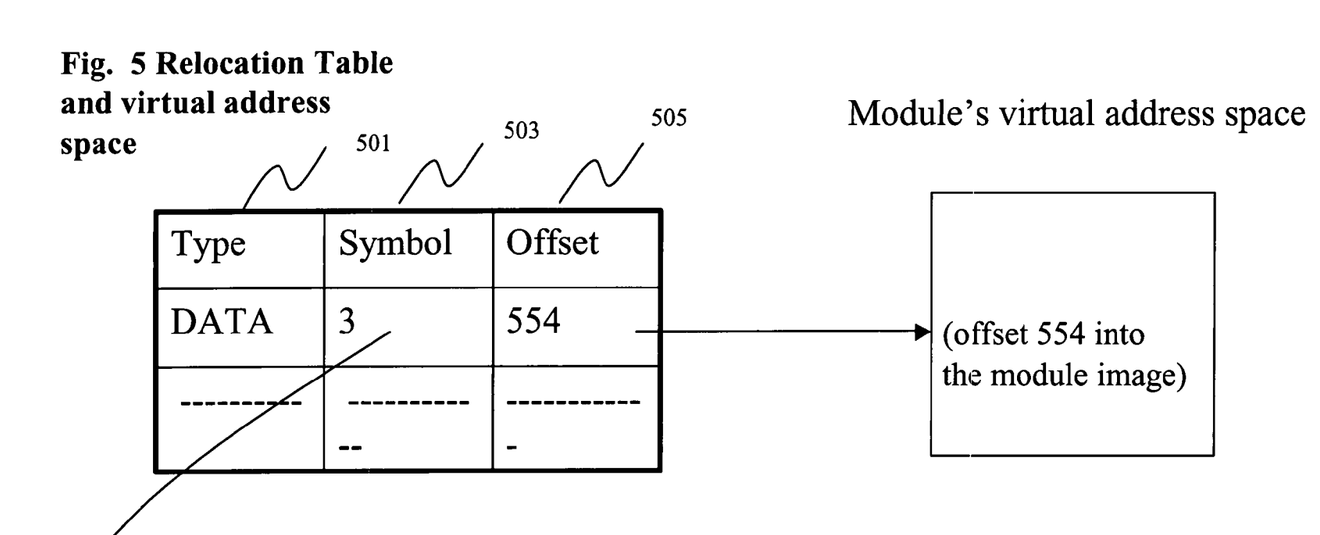
FIG. 5 is a chart illustrating an example relocation table.

More specifically, referring to FIG. 5, the first column 501 of the relocation table contains the type of each entry (e.g., TLS descriptor, data, TLS offset, and etc.), and the second column 503 contains a corresponding index in a symbol table. The last column 505 contains an address within the dynamic library that generally refers to GOT entries or global data, but can also refer to code if relocations are required there, as illustrated in FIG. 5.

Figure 6:
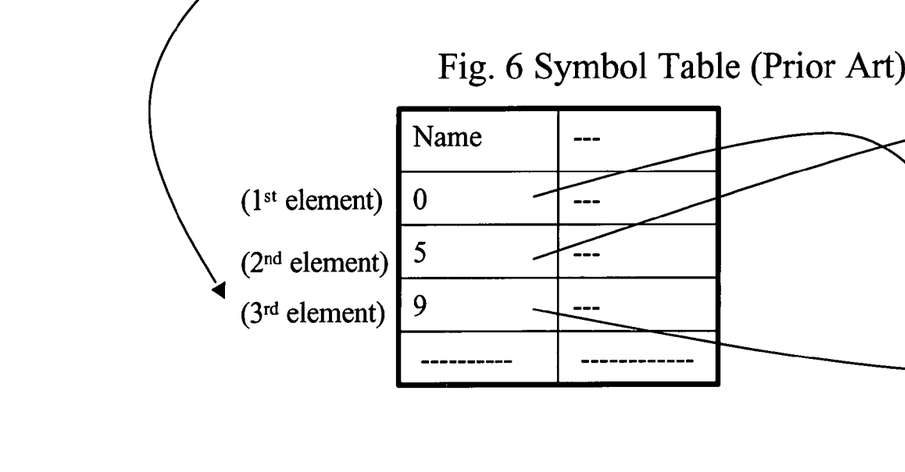
FIG. 6 is a chart illustrating an example symbol table.
Figure 7:
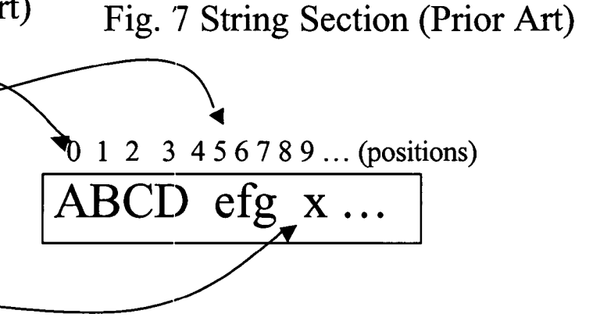
FIG. 7 is a chart illustrating an example string section.

As known in the art, the relocation table allows the dynamic loader to resolve the symbols listed in the second column using a symbol table and a string section, to compute a value according to a formula determined by the relocation type, and to store the results into the corresponding address in the third column. Examples of the string table and symbol section are illustrated in FIGS. 6 and 7, respectively.

As discussed above, position-independent code cannot, in general, contain absolute virtual addresses. For this reason, the GOT 417 is provided for each position-independent module for storing absolute addresses in private data, thus making the addresses available without compromising the position-independence and share-ability of the code in the module. A program references a global offset table using position-independent addressing and extracts absolute values, thus redirecting position-independent references to absolute locations.

Initially, the global offset table holds information as required by its relocation entries if the relocation entries need information that is not in the relocation table itself. After mapping segments of the loadable module into the main memory, the dynamic loader processes the relocations, some of which apply to the global offset table. The dynamic loader determines the associated symbol definitions, computes whatever information the relocation type may require (e.g., the absolute address of the symbol, its TLS offset, etc). The dynamic loader then sets the appropriate memory locations to the computed values. Although the absolute addresses are unknown when the link editor builds a module, the dynamic loader knows the addresses of all memory segments and, thus, can calculate the absolute addresses of the symbols.

In other words, if a program requires direct access to the absolute address of a symbol, that symbol has an entry in a global offset table (GOT). Because the executable file and dynamic libraries have separate global offset tables, the address of a symbol may appear in several tables. The dynamic loader processes all relocations before giving control to any other module in the process image, thus ensuring the absolute addresses are available during execution.

Referring back to FIG. 4, a procedure linkage table 415 redirects position-independent function calls to absolute locations in the virtual memory space. The link editor cannot resolve execution transfers (such as function calls) from one executable or shared object to another at the link time. Consequently, the link editor arranges to have the program transfer control to entries in the procedure linkage table 415. The procedure linkage tables may reside in shared text, but they use addresses in a private global offset table 417 (to be discussed below). The dynamic loader determines the absolute addresses of the destinations and modifies the global offset table's memory image accordingly at the load time.

A TLS section 419 specifies the size and initial contents of thread-local storage. This information is used in creating separate copies of the TLS section and allocating memory spaces for them. The copies of the thread-local storage are associated with individual threads of execution. Using the allocated thread-local storage, threads can access TL variables defined therein.

Figure 8:
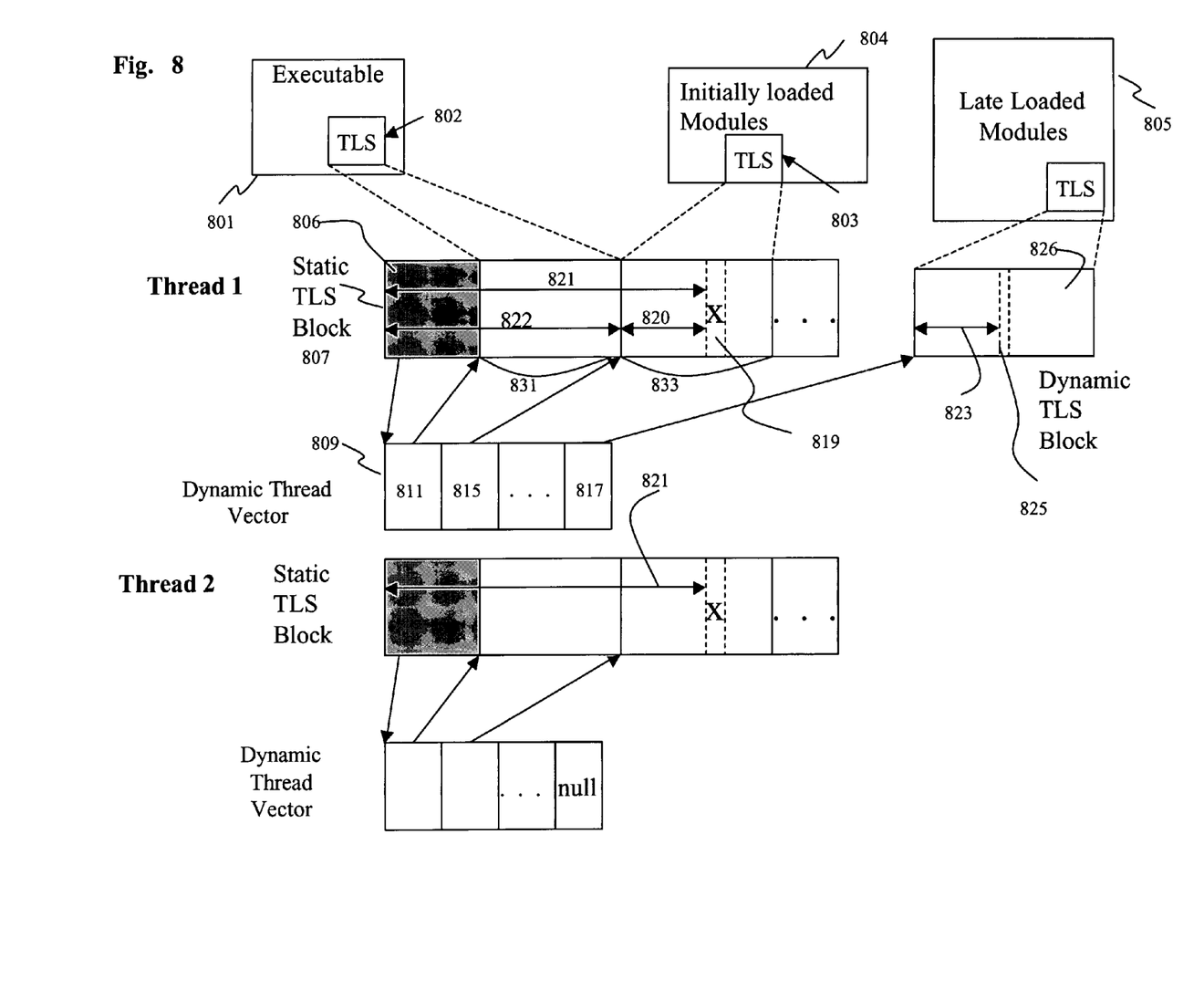
FIG. 8 is a diagram illustrating example thread-local storage blocks and dynamic thread vectors that can be used to implement embodiments of the present invention.

The creation and management of a TLS block for each thread is illustrated in FIG. 8. The top row illustrates various modules: a main executable module 801, other initially-loaded modules 804, and late-loaded modules 805. As described above, initially-loaded modules and late-loaded modules are all dynamic library modules, but they are loaded at different times. The initially-loaded modules are loaded at start-up time (i.e., before the process starts to be executed), and the late-loaded modules are loaded during execution, using mechanisms such as the dlopen( ) function.

At start-up time, the dynamic loader computes the overall size of the TLS section 802 for the executable and the overall size of the TLS section 803 for the initially-loaded modules 804. Using this information, the dynamic loader lays out the structure of static TLS blocks 807 for the process, determining the base offset 822 for each initially-loaded module. The static TLS block 807 is a collection of TLS blocks for all the initially-loaded modules. One such static block is allocated for each thread. In other words, every time a thread is created, a static TLS block 807 is allocated with sufficient space for a thread control block 806 and copies of the TLS sections of the executable and initially-loaded modules. For late-loaded modules, separate TLS blocks are allocated on demand, e.g., when any variable from a specific late-loaded module is first referenced within a thread. Note that "thread 2" shows a dynamic TLS block where a dynamic library has been loaded but its TLS block has not been allocated.

The dynamic loader computes the base addresses of the TLS blocks and stores them in a dynamic thread vector (DTV) 809. In particular, the first location 806 of the static TLS block 807 contains the base address of the dynamic thread vector, and each entry of the dynamic thread vector contains the relative address of each TLS block with respect to the base address of the static TLS block 807. In an alternative embodiment, the dynamic thread vector contains the absolute addresses of the TLS blocks.

More specifically, the first entry 811 of the dynamic thread vector 809 for Thread 1 contains the base address of the TLS block 831 of the executable for Thread 1. The second entry 815 of the dynamic thread vector 809 contains the base address of the TLS block 833 of the initially-loaded library module for Thread 1. The last entry 817 of the dynamic thread vector 809 contains the base address of the TLS block 826 of the late-loaded library module for Thread 1.

After the memory for the static TLS block 807 is allocated, the dynamic loader copies the contents of the thread local storage sections from the executable and the initially-loaded modules to the static TLS block 807. As soon as the static TLS block 807 and the dynamic thread vector are initialized, a thread can start running. Similarly, the contents of the TLS section for late loaded modules are copied to dynamic TLS blocks 826, generally allocated on demand (i.e., at the time of the first access to a TL variable of that module within a thread). There may be up to one dynamic TLS block for each late-loaded module and for each thread.

Whenever a thread accesses a TL variable, it needs to determine the address of the copy of the TL variable specific for the thread. Several different known mechanisms can be used in computing the addresses of TL variables.

1) The most general but least efficient access model for TL variables is called the General Dynamic model. In this model, the routine _tls_get_addr( ) is traditionally called to obtain the address of a TL variable. This is the function that allocates dynamic TLS blocks upon the first access and stores their base addresses in the appropriate position in the dynamic thread vector. This function can also de-allocate dynamic TLS blocks for unloaded modules or enlarge the DTV, if necessary.

As soon as the function determines that it does not have to enlarge the DTV, de-allocate, or allocate dynamic TLS blocks, the function loads the base address of the TLS block of a module from the DTV. This function then adds the base TLS address and the in-module offset resulting in the address of the TL variable. This result is returned by the function.

2) When a TL variable is known to be local to the module that references it, the Local Dynamic model can be used. In this model, the routine _tls_get_addr( ) is traditionally called to compute the base address of the TLS block (e.g., 826) of the module. The computed base address can be used as a base address for all TL variables defined in the module. This base address (e.g., the value stored in 817) is added to an in-module offset 823 to compute the address of a TL variable 825.

The General and Local Dynamic models are used in dynamic libraries that can be loaded at run-time. For every variable or module whose TLS address is to be computed by _tls_get_addr( ), a TLS descriptor has to be present in the GOT.

3) When a referenced TL variable 819 can be assumed to be in a static TLS block, a mechanism known as the Initial Exec model is used. Under such an assumption, the TLS offset (e.g., 821) of a TL variable is a load-time constant. This means that the value of the TLS offset is identical in all static TLS blocks. Hence, the TLS offset is also called the thread-pointer offset, in the art. For this case, instead of calling _tls_get_addr( ), an entry in the GOT is created to hold the TLS Offset of the TL variable. The TLS offset is added to the base address of the static TLS block (e.g., 807), generally held in a global register, and the TL variable can be accessed. The TLS offset is computed, for example, by adding a base TLS Offset (e.g., 822) of the module where the TL variable is defined and an in-module offset (e.g., 820) of the TL variable. The in-module offset is also known in the art as the value (or virtual address) of a TLS symbol. The corresponding TLS Offset entry in the GOT (see FIG. 9) is filled with the TLS offset.

4) Another mechanism known as the Local Exec model is a combination of Local Dynamic with Initial Exec. The Local Exec model is used for TL variables known to be part of the main executable itself. In this mechanism, the base TLS address of the executable is computed by loading it from the GOT (or using a constant, if it the base TLS offset of the executable is specified in the ABI). This value is added to an in-module TLS Offset of the variable, which is a link-time constant.

Conventionally, the linker attempts to optimize General Dynamic to Initial Exec, and Initial Exec or Local Dynamic to Local Exec. This introduces performance improvements in executables, but not in dynamic libraries. This is because the linker is not supposed to introduce Initial or Local Exec models if the dynamic library does not already use them, otherwise it would be denying the dynamic library the ability to be late loaded. Hence, the Initial Exec and Local Exec models are used only in the main executable, or in dynamic libraries that intentionally give up the ability to be late loaded.

As noted above, embodiments of the present invention are implemented in a computer architecture that allows a register plus displacement indirect addressing mode. Some machines offer "load" and "store" instructions that can add a constant to a base register, and then use the result of the addition as the address of a memory location to read or modify. Such constants, known in this context as displacements, can be used in accessing thread-local storage blocks using the Local Dynamic and the Local Exec models.

Several hardware architectures offer only a limited range for such displacements, if such addressing modes are at all available. If the displacements are signed fields, it is possible to extend the range addressable locations from a base register by biasing the base register. For instance, the most negative offset can address the location that originally would have been addressed with a zero offset, and the most positive offset can address almost twice as far as the most positive offset without biasing the base register.

For example, the Fujitsu FR-V (TM) architecture supports "load" and "store" instructions that add a 12-bit signed displacement to a base register, a bias of 2032 bytes can be chosen. In this example embodiment, the bias is 2032 bytes, instead of 2048 bytes, because of another optimization, aimed at the Local Exec model. Setting the thread pointer to 2032 bytes past the beginning of the TLS block of the executable, a 16-byte thread control block (e.g., the shaded area in 807) can be accessed using the −2048 byte offset from the thread pointer register. By using a fixed offset for the main executable, the need for the Local Exec model to load the TLS Offset for the main executable from the GOT is removed, since it is a known constant.

A thread pointer is a register reserved to hold a thread-specific address. Conventionally, it holds the address of the thread control block, i.e., the base address of the static TLS block. Biasing the thread pointer by a number of bytes (e.g., 2032 bytes) past the base address of the TLS block of the executable, a 16-byte thread control block (e.g., the shaded area in 807) can be accessed using the minus 2048 byte offset from the thread pointer. By using a fixed offset for the main executable, the need for the Local Exec model to load the TLS Offset for the main executable from the GOT is removed, since it is a constant specified in the ABI.

Figure 9:
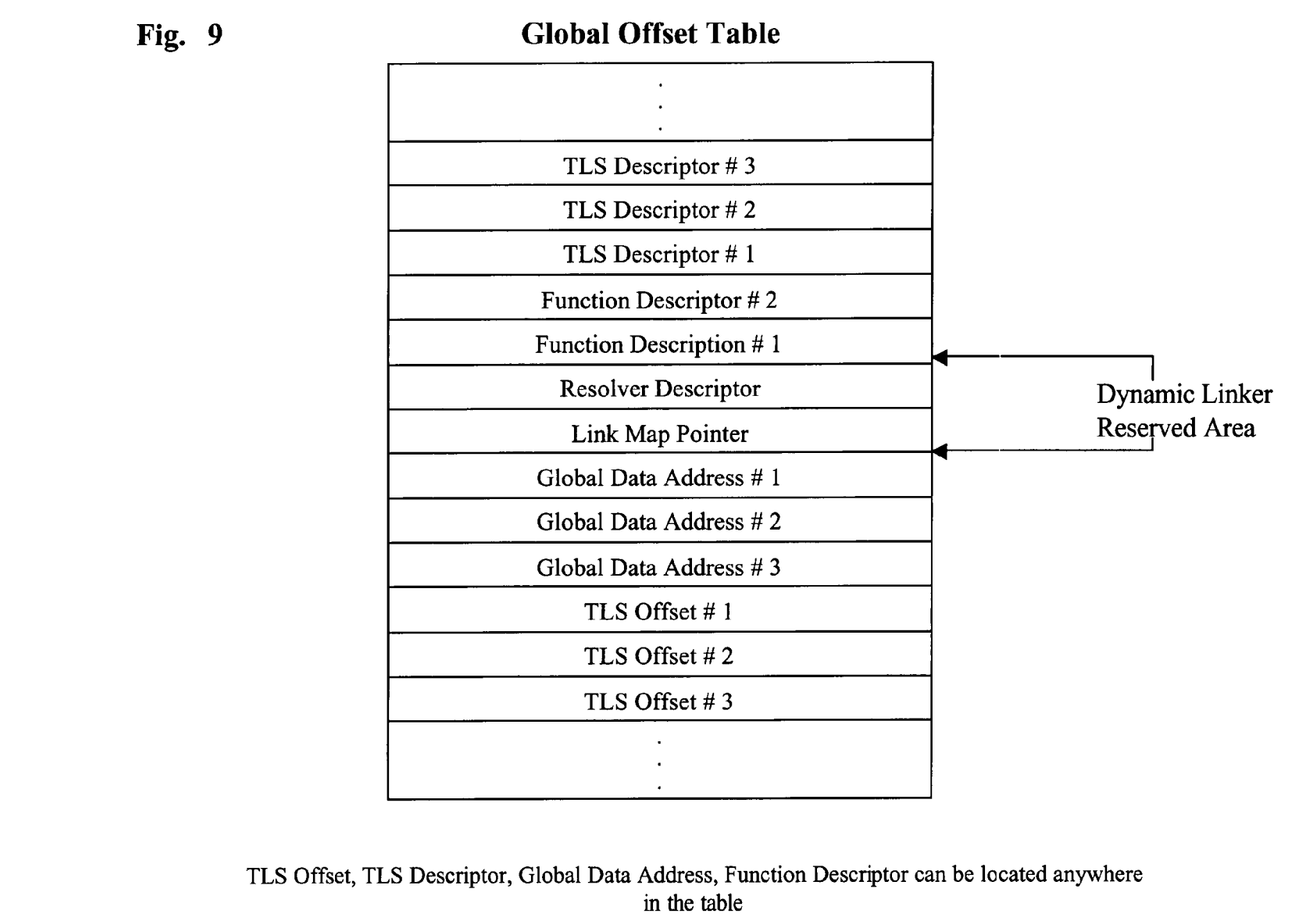
FIG. 9 is a chart illustrating an example Global Offset Table that can be used to implement embodiments of the present invention.

Now turning to describe the GOT, in FIG. 9, TLS Offset entries, for example, are used in Initial Exec and Local Exec models, to hold TLS Offsets for TL variables and for the local module, respectively. TLS Descriptor entries, on the other hand, are used by General and Local Dynamic models, and they hold the information that has to be given to _tls_get_addr( ) in order for it to be able to compute the address of a TL variable or the base address the TLS block. In prior art, TLS descriptors have contained information such as the module identifier (the dynamic thread vector entry for the module) and the in-module offset. In some cases, the TLS descriptor is represented as a single entry; in others, the module id and the in-module offset are stored in separate GOT entries.

Embodiments of the present invention are designed to introduce these optimizations at run time because dynamic libraries could use access models almost as efficient as Initial Exec and, to some extent, Local Exec if libraries are initially-loaded in a process. Embodiments of the present invention cache the computed TLS offset of an initially-loaded TLS variable in the TLS descriptor itself, and add information to a TLS descriptor for a late-loaded variable that enables the program to avoid calling the expensive _tls_get_addr( ) except for the first time the variable is referenced in a thread.

Embodiments of the present invention compute the address of a TL variable in the most efficient way possible by determining, at the time a TLS Descriptor relocation is applied, whether the referenced variable or module turns out to be in the static TLS block or in dynamically-allocated, late-loaded ones. To further improve performance, the function variants called to play the role of _tls_get_addr( ) are specified to not modify most of the machine registers that a caller would otherwise be required to preserve.

Figure 10:
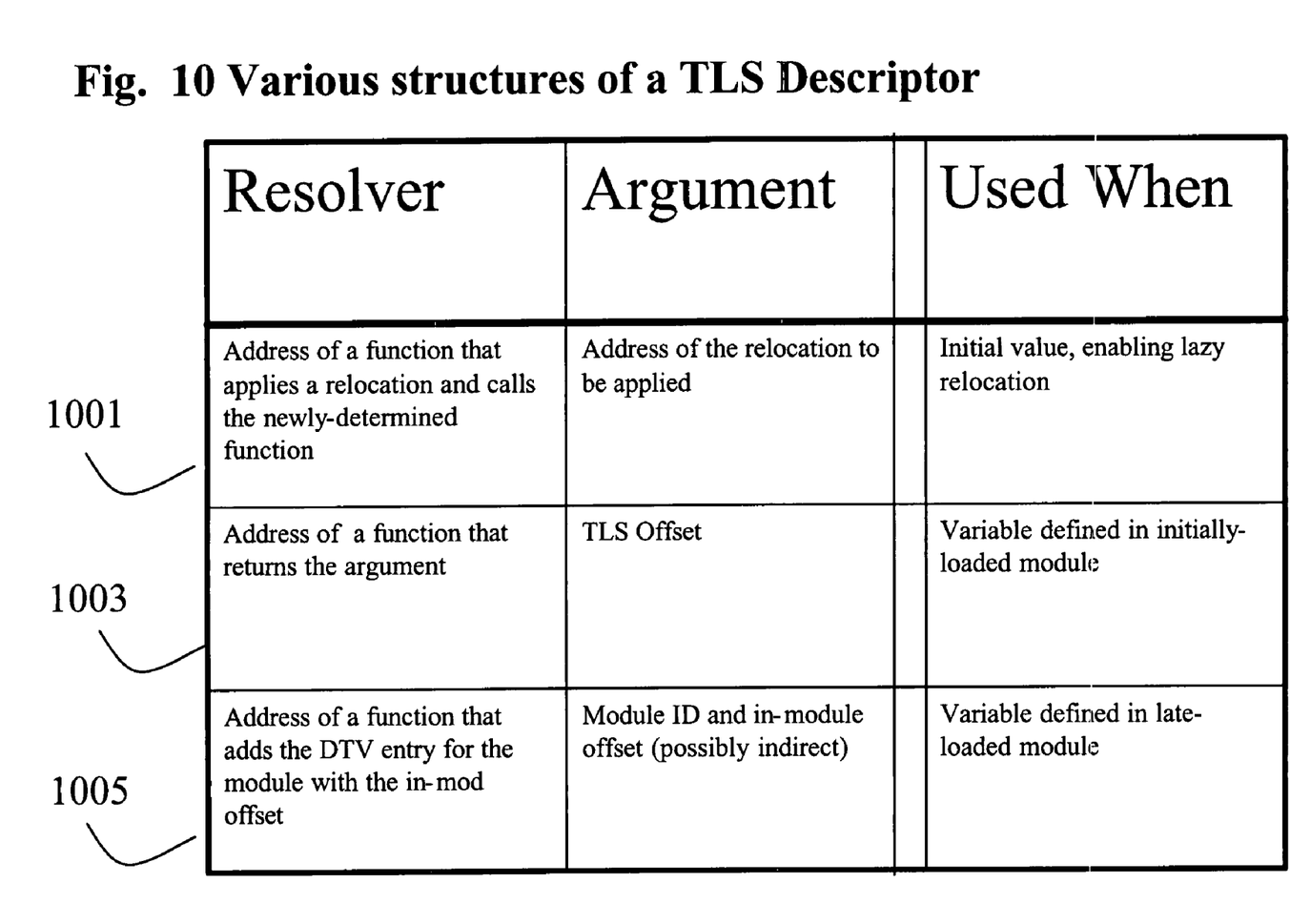
FIG. 10 is a chart illustrating the structure of TLS descriptors according to an example embodiment of the present invention.

A simple embodiment of the invention could use two-word TLS Descriptors: a resolver and an argument. Three examples (1001, 1003, 1005) are illustrated in FIG. 10. More specifically, in a TLS Descriptor, the resolver may hold the address of a piece of code that, using the information from the argument, can determine the address of the variable whose address the TLS Descriptor is supposed to describe.

When the dynamic loader is to apply a dynamic relocation of type TLS Descriptor, referencing a certain TL variable, if the variable happens to be in the Static TLS block (i.e., an initially-loaded module), it stores the TLS Offset of the TL variable in the argument (e.g., "TLS offset" as specified in the argument section of 1003). In the resolver, in this case, it stores the address of a piece of code that simply returns the argument (e.g., "address of a function returns the argument" as specified in the resolver section of 1003). Since it is supposed to be passed the argument stored in the TLS Descriptor, it ends up returning the offset of the TL variable.

If the variable is expected to be in dynamically-allocated TLS blocks (i.e., the late-loaded module), however, the dynamic loader stores in the argument of the TLS Descriptor information that is typically passed to _tls_get_addr( ), and in the resolver, a piece of code that determines efficiently whether _tls_get_addr( ) has to be called (e.g., "address of a function that adds the DTV entry for the module with the in-module offset" as specified in the resolver section of 1005). In one embodiment, the argument can include the module-id and in-module offset, as shown in the argument section of 1005. In another embodiment, the argument may also include (a) other information that can be used to speed up the decision of whether to call _tls_get_addr( ), e.g., a module generation counter, and (b) any information needed by this piece of code to call _tls_get_addr( ), e.g., a context pointer that would have been stored in a function descriptor. Instead of making the TLS descriptor big enough to fit all this information, it is possible to store in the argument position the address of a separately-allocated data structure holding all information.

The resolver, using information from the argument passed to it, can quickly determine whether _tls_get_addr( ) needs to be called to update the dynamic thread vector, or to dynamically allocate a TLS block. If none of these activities is necessary, it loads the entry corresponding to the module from the dynamic thread vector, adds to it the in-module TLS offset, and returns the result. Otherwise, it saves all registers that _tls_get_addr( ) might modify, calls it with the arguments it needs, restores the saved registers and returns the value it returned by _tls_get_addr( ) minus the base address of the static TLS block.

Figure 11:
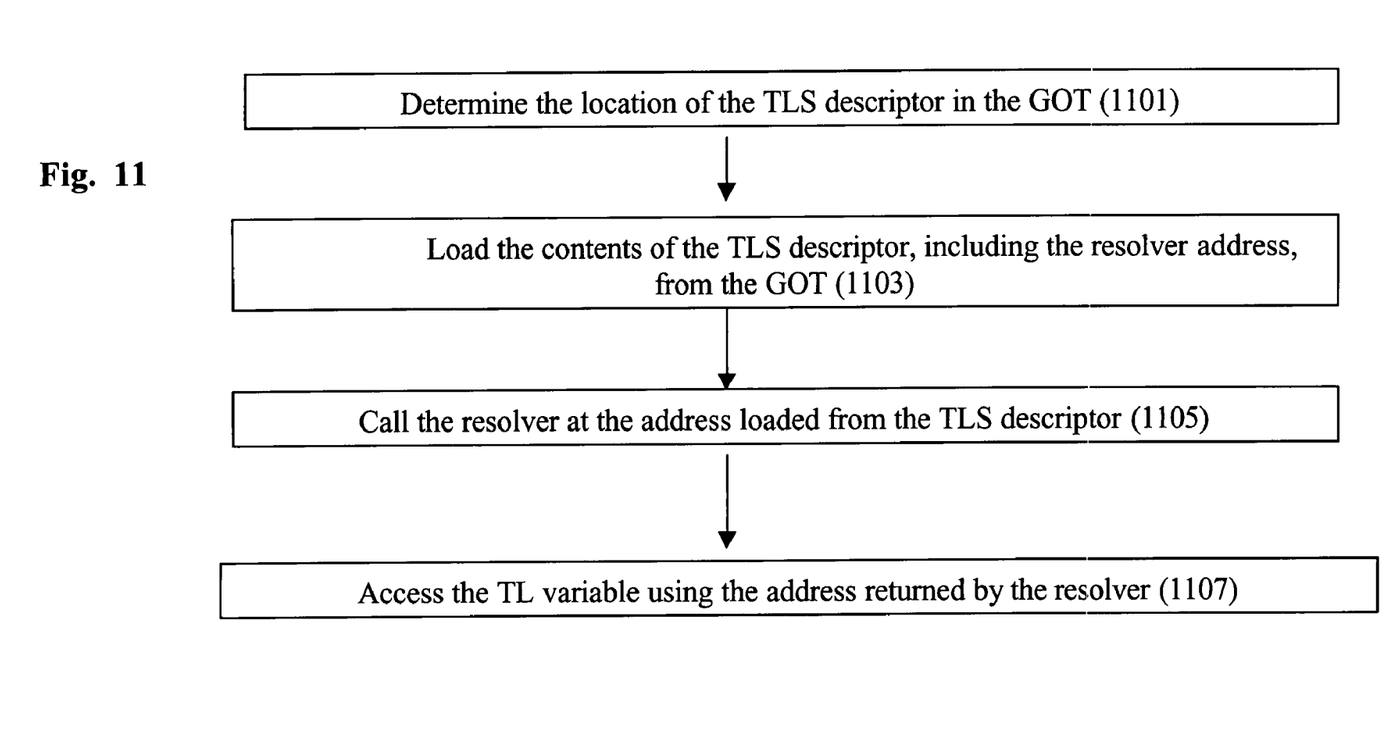
FIG. 11 is a flow chart illustrating an example of the sequence of steps a program executes to determine the address of a TL variable in embodiments of the present invention.

Filling in the TLS Descriptor as shown above enables the computation of the TLS address of a variable to be accomplished with a sequence of instructions as depicted in FIG. 11: a) determine the location of the TLS descriptor in the GOT (1101); b) load the contents of the TLS descriptor, including the resolver address, from the GOT (1103); c) call the resolver at the address loaded from the TLS descriptor (1105); and d) access the TL variable using the address returned by the resolver (1107). In some embodiments, the returned address can be absolute. In others, it is a relative address, which has to be added to a thread pointer to determine the absolute address of the variable. If the computer offers instructions that can, in a single load or store instruction, add two registers to determine the memory address to be accessed, relative addresses may be preferred.

Alternate embodiments of the invention may use larger TLS descriptors, so as to avoid the need for dynamically allocating the argument data structure for the non-static TLS case. In some embodiments, smaller TLS descriptors, using pieces of code generated dynamically by the dynamic loader as resolver functions can also be used. These resolver functions can be configured to have the argument value built into them. These resolver functions can call one of the two resolver functions (e.g., 1003 or 1005) described above, or perform their functions directly.

These embodiments enable the omission, from the dynamic thread vector, of TLS block addresses for initially-loaded modules. This is possible because the use of the optimized resolver functions imply that _tls_get_addr( ) will never be called for a module whose TLS is in the static TLS block. This further enables dynamic, on-demand allocation of the dynamic thread vector, reducing the thread start-up cost.

The address of a resolver function in a TLS descriptor enables another optimization over conventional systems by using a feature similar to the technique called lazy resolution of function addresses. In particular, the TLS Descriptor is initialized with the address of a lazy resolver and the argument to the address of the relocation entry. For instance, the TLS descriptor can be filled with the "address of a function that applies a relocation and calls the newly-determined function" in the resolver section and the "address of the relocation to be applied" in the argument section as illustrated in 1001.

This enables the dynamic loader to not determine the location of the TL variable at the time it applies the relocation, which is computationally expensive. Instead, the lazy resolver performs this operation on demand (i.e., the first time the lazy resolver is called for a TLS descriptor). After the lazy resolver determines in which module the variable is located, the lazy resolver can test whether the thread-local storage of the module is in a static TLS block or not. Subsequently, the lazy resolver can perform the final relocation, such that, the next time the resolver function address is loaded from the TLS descriptor, one of the two (e.g., 1003 or 1005) other resolver functions will be called.

Figure 12:
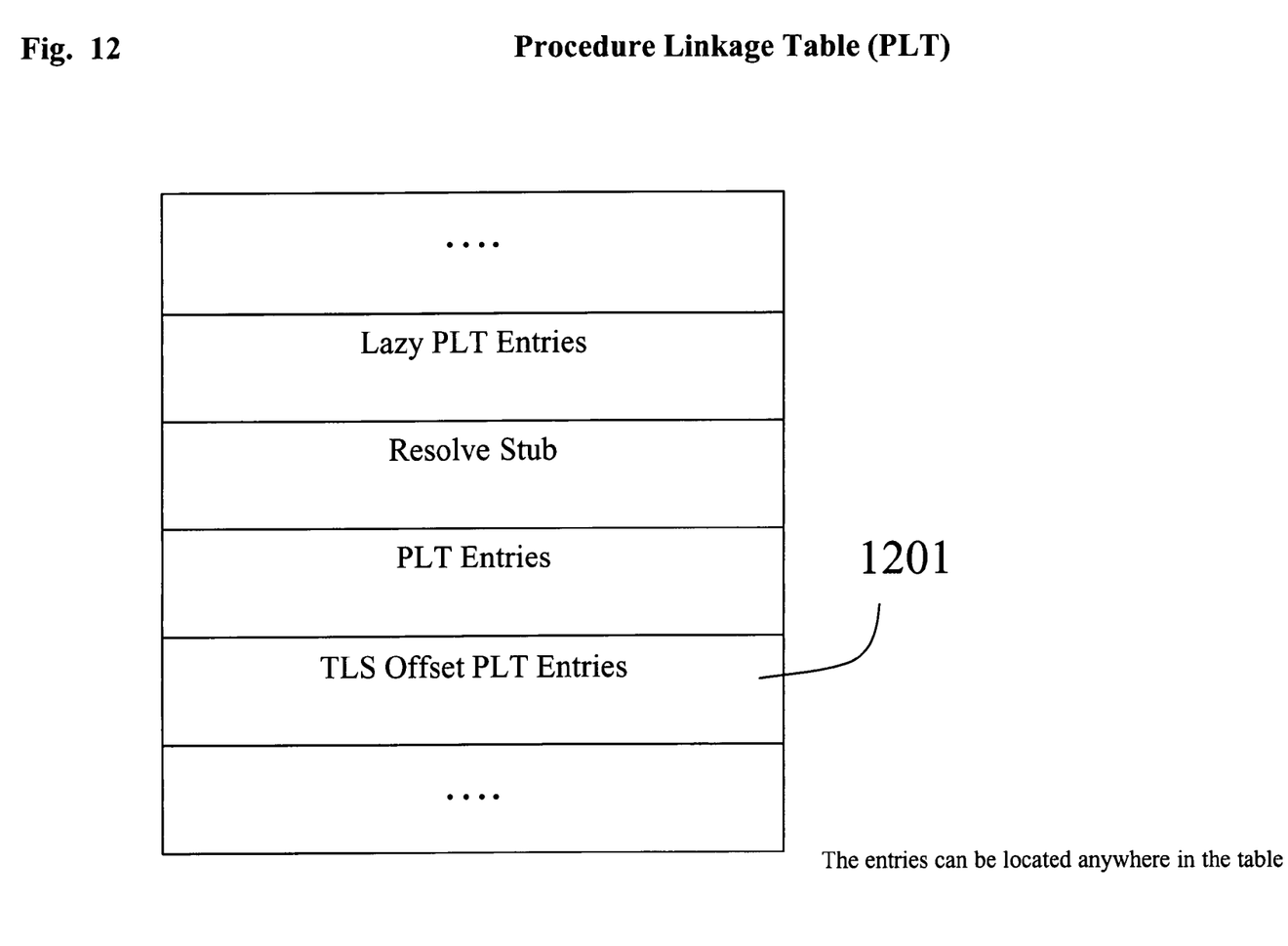
FIG. 12 is a chart illustrating an example Procedure Linkage Table that can be used to implement embodiments of the present invention.

FIG. 12 illustrates a portion of the procedure linkage table (PLT), which includes lazy PLT entries, resolve stub, PLT entries, and TLS offset PLT entries. The sequence of instructions in FIG. 11 can be moved into a TLS Offset PLT Entry (1201). This allows a single call instruction that uses this PLT Entry to compute the TLS offset. Such a call instruction, generated by the compiler, can often be replaced at link time by a single load instruction if the linker determines that Initial Exec or Local Exec access models can be used.

While there have been shown and described examples of the present invention, it will be readily apparent to those skilled in the art that various changes and modifications may be made without departing from the scope of the invention as defined by the following claims. The embodiments of the present invention are applicable to any operating system (e.g., Linux™, Unix, Microsoft Windows, MacOS, etc.). Accordingly, the invention is limited only by the following claims and equivalents thereto.

What is claimed is:

1. A software method for obtaining an address of a thread-local variable while executing a computer program, comprising the acts of:
   a) designating a memory location to store an address of a function;
   b) after the computer program starts to run, obtaining the address of the thread-local variable by executing a function whose address is stored in the memory location when a module that references the thread-local variable is loaded;
   c) computing a thread-pointer offset of the thread-local variable, wherein the thread-pointer offset value is a relative address of the thread-local variable from a base address of a static thread-local storage block in which the thread-local variable is allocated; and
   d) storing, at the memory location, an address of a first function configured to use the computed thread-pointer offset in computing the address of the thread-local variable.

2. The method of claim 1, further comprising the acts of:
   e) computing a module id and an in-module offset, wherein the module id is an identifier of the module in which the variable is defined, and the in-module offset value is the relative address of the thread-local variable from the base address of a thread-local storage block in which the thread-local variable is allocated; and
   f) storing, at the memory location, an address of a second function configured to use the in-module offset and module-id in computing the address of the thread-local variable.

3. The method of claim 2, further comprising act of:
   storing, at the memory location, an address of a third function configured to determine in which module the variable is defined and determine whether the thread-local storage for the module is allocated in a static or dynamic thread-local storage block, wherein the third function is further configured to:
   perform acts c) and d), if the thread-local variable is allocated in a static thread-local storage block, and perform acts e) and f), if the thread-local variable is allocated in a dynamic thread-local storage block.

4. The method of claim 3, wherein the memory location forms a portion of a corresponding thread-local storage descriptor of the thread-local variable.

5. The method of claim 1, further comprising the acts of:
   creating a dynamic vector containing a plurality of pointers;
   writing to each pointer a base address of a thread-local storage block; and
   biasing the plurality of pointers, wherein each biased pointer contains a value computed by adding a bias value and a base address of a thread-local storage block.

6. The method of claim 1, further comprising the acts of:
   creating a dynamic vector containing a plurality of pointers; and
   writing to the pointers base addresses of only dynamic thread-local storage blocks.

7. A computer program product, residing on a computer-readable medium, wherein the computer-readable medium comprises one of non-volatile media and volatile media, the computer program product comprising computer instructions for configuring a computer to perform the acts of:
   a) designating a memory location to store an address of a function;
   b) after the computer program starts to run, obtaining the address of the thread-local variable by executing a function whose address is stored in the memory location when a module that references the thread-local variable is loaded;
   c) computing a thread-pointer offset of the thread-local variable, wherein the thread-pointer offset value is a relative address of the thread-local variable from a base address of a static thread-local storage block in which the thread-local variable is allocated; and
   d) storing, at the memory location, an address of a first function configured to use the computed thread-pointer offset in computing the address of the thread-local variable.

8. The product of claim 7 further comprising instructions for configuring the computer to perform the acts of:
   e) computing a module id and an in-module offset, wherein the module id is an identifier of the module in which the variable is defined, and the in-module offset value is the relative address of the thread-local variable from the base address of a thread-local storage block in which the thread-local variable is allocated; and
   f) storing, at the memory location, an address of a second function configured to use the in-module offset and module-id in computing the address of the thread-local variable.

9. The product of claim 8 further comprising instructions for configuring the computer to perform the acts of:
   storing, at the memory location, an address of a third function configured to determine in which module the variable is defined and determine whether the thread-local storage for the module is allocated in a static or dynamic thread-local storage block, wherein the third function is further configured to:
   perform acts c) and d), if the thread-local variable is allocated in a static thread-local storage block, and perform acts e) and f), if the thread-local variable is allocated in a dynamic thread-local storage block.

10. The product of claim 9, wherein the memory location forms a portion of a corresponding thread-local storage descriptor of the thread-local variable.

11. The product of claim 7, further comprising instructions for configuring the computer to perform the acts of:
   creating a dynamic vector containing a plurality of pointers;
   writing to each pointer a base address of a thread-local storage block; and biasing the plurality of pointers, wherein each biased pointer contains a value computed by adding a bias value and a base address of a thread-local storage block.

12. The product of claim 7, further comprising instructions for configuring the computer to perform the act of:
creating a dynamic vector containing a plurality of pointers; and
writing to the pointers base addresses of only dynamic thread-local storage blocks.

13. A computer system with a main memory and a processor, comprising:
a program linked with dynamic library modules configured to:
a) designate a memory location to store an address of a function;
b) after the computer program starts to run, obtain the address of the thread-local variable by executing a function whose address is stored in the memory location when a module that references the thread-local variable is loaded;
c) compute a thread-pointer offset of the thread-local variable, wherein the thread-pointer offset value is a relative address of the thread-local variable from a base address of a static thread-local storage block in which the thread-local variable is allocated; and
d) store, at the memory location, an address of a first function configured to use the thread-pointer offset in computing the address of the thread-local variable.

14. The computer system of claim 13, wherein the dynamic loader is further configured to:
e) compute a module id and an in-module offset, wherein the module id is an identifier of the module in which the variable is defined, and the in-module offset value is the relative address of the thread-local variable from the base address of a thread-local storage block in which the thread-local variable is allocated; and
f) store, at the memory location, an address of a second function configured to use the in-module offset and module-id in computing the address of the thread-local variable.

15. The computer system of claim 14, wherein the dynamic loader is further configured to:
store, at the memory location, an address of a third function configured to determine in which module the variable is defined and deterrriine whether the thread-local storage for the module is allocated in a static or dynamic thread-local storage block, wherein the third function is further configured to:
perform acts c) and d), if the thread-local variable is allocated in a static thread-local storage block, and
perform acts e) and f) if the thread-local variable is allocated in a dynamic thread-local storage block.

16. The computer system of claim 15, wherein the memory location forms a portion of a corresponding thread-local storage descriptor of the thread-local variable.

17. The computer system of claim 13, further comprising:
create a dynamic vector containing a plurality of pointers;
write to each pointer a base address of a thread-local storage block; and
bias the plurality of pointers, wherein each biased pointer contains a value computed by adding a bias value and a base address of a thread-local storage block.

18. The computer system of claim 13, further comprising:
create a dynamic vector containing a plurality of pointers; and
write to the pointers base addresses of only dynamic thread-local storage blocks.

* * * * *